United States Patent [19]
Taylor

[11] Patent Number: 5,806,566
[45] Date of Patent: Sep. 15, 1998

[54] STORM DRAINAGE CONDUIT PLUG AND SEALING BAND THEREFOR

[76] Inventor: James R. Taylor, 5621 Sarah Ave. #103, Sarasota, Fla. 34233

[21] Appl. No.: 896,448

[22] Filed: Jul. 18, 1997

[51] Int. Cl.$^6$ .................................................. F16L 55/10
[52] U.S. Cl. ............................................ 138/89; 220/789
[58] Field of Search ...................... 138/89, 89.1–89.4, 138/90; 220/789, 791, 801, 804, 805, 378, 241, DIG. 19

[56] References Cited

U.S. PATENT DOCUMENTS

| | | | |
|---|---|---|---|
| 798,507 | 8/1905 | Hally | 138/89 X |
| 824,896 | 7/1906 | Willis | 138/89 X |
| 1,137,466 | 4/1915 | Dillon | 138/89 X |
| 1,435,008 | 11/1922 | Joy | 138/89 |
| 1,491,325 | 4/1924 | Thomas, Jr. | 138/89 X |
| 1,683,345 | 9/1928 | Geyer | 220/358 |
| 1,988,044 | 1/1935 | Moran | 220/358 X |
| 2,117,807 | 5/1938 | Jesser | 220/357 |
| 2,506,362 | 5/1950 | Hofmann | 138/89 X |
| 2,709,046 | 5/1955 | Hyde | 138/92 |
| 3,525,366 | 8/1970 | Defrees | 138/109 |
| 3,675,685 | 7/1972 | Potter | 138/89 |
| 3,780,773 | 12/1973 | Haugen . | |
| 3,807,457 | 4/1974 | Logsdon | 138/89 |
| 4,231,486 | 11/1980 | Bock | 220/789 X |
| 4,854,476 | 8/1989 | Serio, Jr. | 220/357 |
| 4,955,504 | 9/1990 | Lesscher | 220/352 |
| 5,181,626 | 1/1993 | Daenen et al. | 220/789 X |
| 5,224,514 | 7/1993 | Taylor | 138/89 |
| 5,316,045 | 5/1994 | Taylor | 138/89 |
| 5,353,472 | 10/1994 | Benda et al. | 220/DIG. 19 X |
| 5,605,241 | 2/1997 | Imperioli | 220/789 X |

*Primary Examiner*—Patrick F. Brinson
*Attorney, Agent, or Firm*—Charles J. Prescott

[57] ABSTRACT

A reusable storm drainage conduit plug and elastomeric sealing band therefor for temporarily or permanently sealingly closing an exposed open end of an in-situ tubular drainage conduit. The plug is nominally sized in diameter to prevent dirt and debris from entering the conduit open end during construction and is easily removable when construction proceeds further. The plug includes a rigid disc-shaped member having an inner and an outer panel and a gripping handle on the outer panel. A unique elastomeric sealing band is elastically stretched for securement around a somewhat cylindrical sealing surface which extends generally orthogonally and preferably at a slight taper from the inner panel. The resilient band has a unique cross section which sealingly accommodates virtually all variations in the nominal conduit inside diameter while providing both full sealing engagement and gripping, biased positional retention therein.

8 Claims, 2 Drawing Sheets

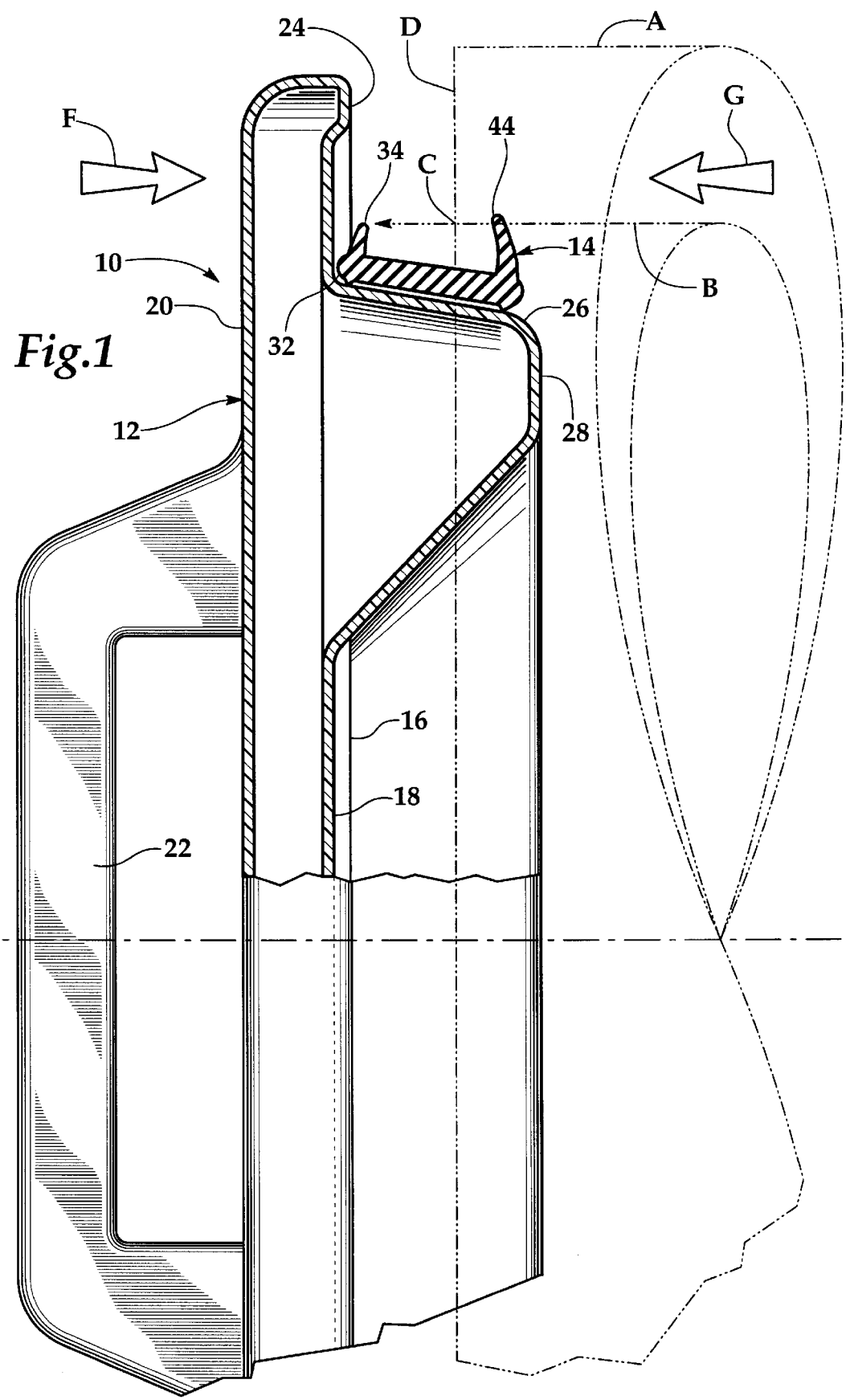

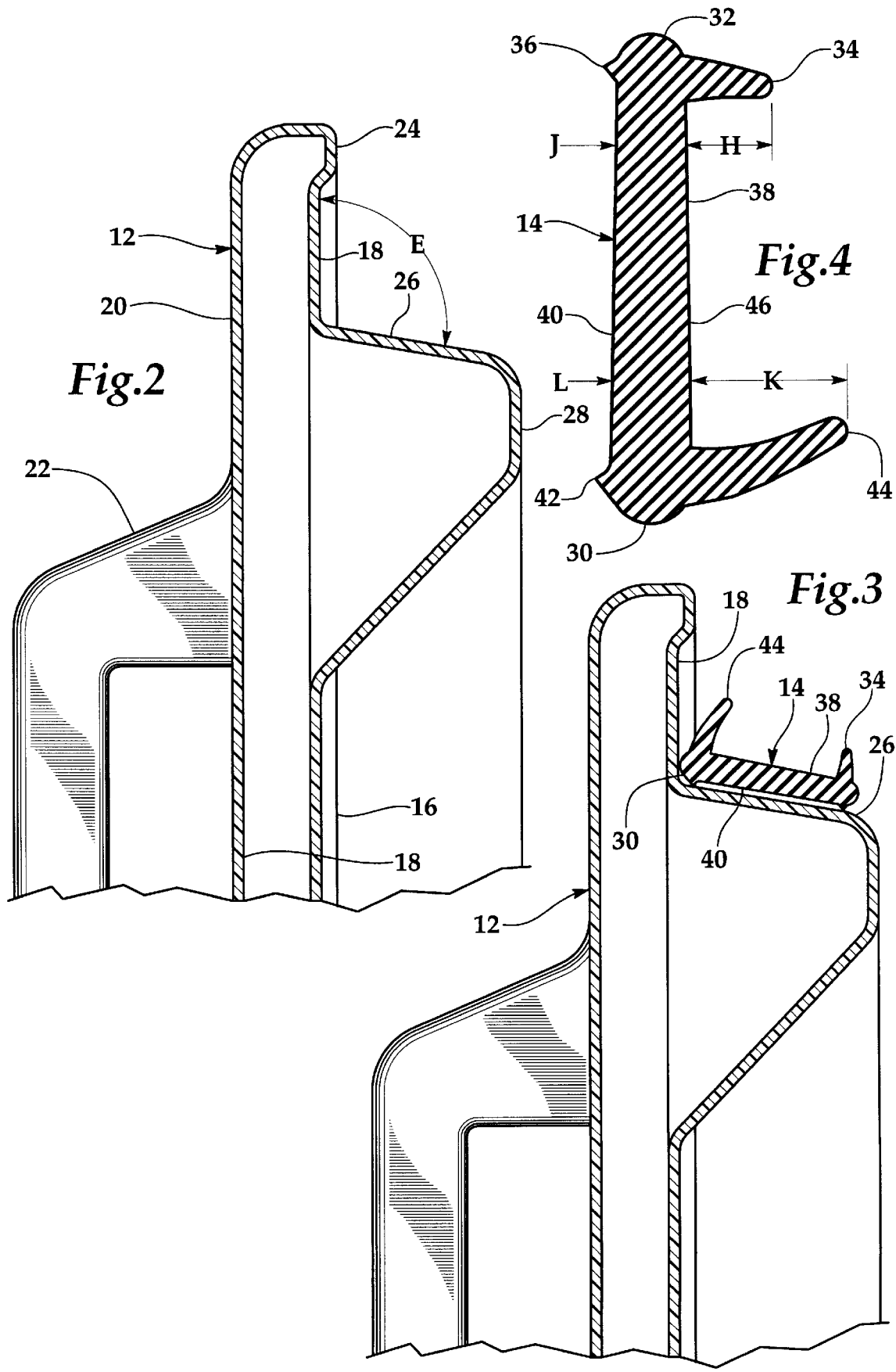

STORM DRAINAGE CONDUIT PLUG AND SEALING BAND THEREFOR

BACKGROUND OF THE INVENTION

1. Scope of Invention

This invention relates generally to devices for sealing conduit openings and more particularly to a reusable storm drain conduit plug with resilient sealing means removably installable for preventing debris and the like from entering the conduit open end during construction.

2. Prior Art

During storm drainage system or sanitary sewer construction, sections of preformed reinforced concrete drainage conduit are laid in place and sealed end to end to ultimately form the completed drainage system. These lengths of conduit are typically fabricated of concrete and include end configurations which facilitate easy mating with the next successive conduit and are permanently sealable at or after installation. Pipe plugs are now more broadly used on or in pvc, polyethylene, concrete, steel and metal pipe.

At a point during the construction when the laying of conduit into a suitable trench and prepared bed must be temporarily interrupted, the open end of the last installed conduit is subject to being filled with dirt, debris and mud slurry. This may occur as a result of rain water filling the prepared trench or in situations where the conduit in place must be temporarily covered to allow interrupted traffic pattern to continue.

Additionally, when manholes of storm drainage systems are installed, the horizontal opening which, when completed, will receive a heavy steel manhole cover, or the lower manhole base thereof, is otherwise temporarily open and subject to a worker, debris or tools falling thereinto.

A conventional method of temporarily covering the ends of these conduits and manholes is to place a sheet of plywood over the opening. In covering a manhole having a horizontal opening, such a technique, although inconvenient, is somewhat practical despite the fact that the plywood is not cut to size. However, in situations where the conduit end will be temporarily buried, the contractor must anticipate the stabilizing of a larger sheet of plywood while it is temporarily covered with earth along with the conduit. Even where cut to size, the plywood is hard to handle and will rapidly deteriorate or be damaged.

Where the conduit ends are not so covered, sufficient debris has been known to enter the portion of the drainage system already in place in sufficient quantities so as to functionally obstruct future water flow, requiring its removal prior to continuing with the construction of the remaining conduit system.

Although one of my earlier inventions as set forth in U.S. Pat. No. 5,224,514 was an improvement, that device was structured to be fitted into only the bell-shaped or female end of the drainage conduit. It was subsequently determined that, due to variations in the wall thickness of drainage conduits between manufacturer's nominally sized plugs, e.g. 12", 15", etc. The '514 invention would not fit into all male conduit ends.

Another previous patent of mine as set forth in U.S. Pat. No. 5,316,045 represents my initial attempt at accommodating variations in the nominal inside diameter of particularly concrete fabricated conduit. Although metal and plastic conduit which is manufactured by extrusion is held to quite accurate inside diameter tolerances, concrete conduit, typically used in storm drainage systems, is must less consistent dimensionally. Typically, concrete conduit having a nominal diameter of e.g. 14", will range from one manufacturer to the next +/−½". Since nominal diameters are typically in 1" increments, then, due to this extreme variation in inside diameter, an array of nominally sized conduit plugs similar to those described in my previous patents must be able to fit within virtually any size within the entire diameter range of concrete conduit. Although the addition of the elastomeric band in my '045 patent, in combination with a tapered sealing surface described therein, afforded some range of flexibility for manufacturing variations in inside diameter of conduit, nonetheless extensive gaps between the limits of each nominal diameter were not met by that product, again due to the extremely wide variation in inside diameter of the concrete manufactured conduit.

A further improvement to the '045 patent provided an improved resilient sealing band in conjunction with a redesigned and improved conduit plug which sealingly engaged and was retained within the inside diameter of virtually all concrete conduit based around availability of nominal diameter plug sizes which corresponded to the same nominal inside diameter of the conduit. However, this improvement was also shown in commercial use to be incapable of satisfying the broadest variations in the inside end diameter of concrete and other underground conduit.

BRIEF SUMMARY OF THE INVENTION

This invention is directed to a reusable storm drainage conduit plug and elastomeric sealing band for temporarily sealingly closing an exposed open end of an in-situ tubular drainage conduit. The plug is nominally sized to prevent dirt and debris from entering the belled end of conduit open end during construction and is easily removable when construction proceeds further. The plug includes a rigid disc-shaped member having an inner and an outer panel surfaces and a gripable handle on the outer surface. A uniquely configured elastomeric sealing band is elastically stretched for securement around a somewhat cylindrical or preferably tapered sealing surface which extends generally orthogonally and preferably at a slight taper from the inner surface. The resilient band has a unique cross section which resiliently accommodates virtually all variations in the nominal conduit inside diameter while providing both full sealing engagement and gripping positional retention between the sealing surface and the conduit inside end diameter.

It is therefore an object of this invention to provide an improved storm drainage conduit plug, in combination with a unique elastomeric sealing band which, when installed, will prevent debris, dirt and other objects from inadvertently entering into the otherwise open end of the storm drainage conduit system during construction.

It is yet another object of this invention to provide a highly durable and reusable plug for the open end of concrete conduit which will adapt to any variation in nominal inside diameter of concrete conduit.

In accordance with these and other objects which will become apparent hereinafter, the instant invention will now be described with reference to the accompanying drawings.

BRIEF DESCRIPTION OF THE DRAWINGS

FIG. 1 is a side elevation broken partial section view of the preferred embodiment of the invention in conjunction with a conventional storm drainage conduit in phantom.

FIG. 2 is a partial view of FIG. 1 with the elastomeric sealing band removed.

FIG. 3 is a view similar to FIG. 2 with the resilient elastomeric sealing band in an alternate installed position.

FIG. 4 is an enlarged cross section view of the resilient sealing band itself.

DETAILED DESCRIPTION OF THE INVENTION

Referring now to the drawings, and particularly to FIG. 1, the invention is shown generally at numeral 10 positioned adjacent to and aligned with a straight male end A of a conventional circular concrete drainage conduit shown in phantom. The conduit has a nominal inside diameter shown at B.

The device 10 includes a thin wall plastic plug 12 formed by blow mold techniques for up to 30" in diameter and formed of roto-mold techniques for diameters above 30" as that there are no overlapping seams, panels, edges or wall members as shown. Conventional polyethelene or ABS plastic is utilized with a nominal wall thickness of 1/8". The plug 12 is formed having an outer panel 20 and an inner panel or surface 18. A handle 22 is disposed centrally from the outer panel 20, while the inner panel 18 include s a generally annular shaped raised portion 28 which strengthens the inner panel 18 and also serves to define an outer generally cylindrical, but preferably slightly tapered sealing surface 26. This sealing surface 26 is somewhat smaller in diameter and concentrically located with respect to the outer circular perimeter of the plug 12 as defined by planar surface 24. By this structural arrangement, the hollow plug 12 is completely hermetically sealed so that neither moisture nor water may find its way into the interior volume defined by the plug 12 as shown.

The invention 10 also includes a resilient elastic band 14 formed of elastomeric material and sized in circumference to be stretched and to snugly fit around and against the sealing surface 26 as shown in FIG. 1. This resilient band 14 is uniform in cross section around its entire length, the cross section of which is best seen in FIG. 4. This uniform cross section is preferably solid in nature and molded by extrusion of polyisoprene rubber.

The cross section shown in FIG. 4, when in position for use, includes a radially outwardly facing surface 38 having spaced resilient outwardly extending prominences or flanges 34 and 44 of differing lengths, each flange 34 and 44 defining a different radially outward working diameter with respect to the inside diameter B of the concrete conduit in FIG. 1. As seen in FIG. 1, the inside edge C of the end of the conduit A will contact the further radially extending of the flanges, in this figure flange 44, when the device 10 is moved in the direction of arrow F with the conduit, in effect, moving its inner edge C in the direction of arrow G. By this contact, one, or likely both of the flanges 34 and 44 are deflected and sealably engaged into the inner diametrical surface B.

Although the conduit end A may be in effect forcibly urged in the direction of arrow G toward contact between face D with the planar outer circular perimeter 24, this full engagement therebetween is not necessary for full and complete sealable engagement. This is so because one of the flanges 44 which have been resiliently deflected will effect secure and complete sealing against inside diameter B.

The sealing band 14 also includes second prominences or pointed ribs 36 and 42 extending radially inwardly in spaced relation from each end of the inwardly facing surface 40. These ribs 36 and 44 are generally of equal height, somewhat smaller than flanges 34 and are intended primarily to increase the gripping action against sealing surface 26 to prevent relative movement therebetween when the plug 12 is either installed into or removed from the end of the conduit A.

As seen in FIG. 2, the preferred relationship between the sealing surface 26 and the plane of the perimeter 24 is represented by angle E, preferably equal to about 100° or representing a taper of about 10°. This taper of sealing surface E is utilized particularly well in combination with the cross section shown in FIG. 6 and variations in positional installation of the sealing band 14 as seen in FIG. 3.

In FIG. 3, the sealing band 14 is installed in end-to-end reversed fashion from that in FIG. 1 wherein edge 30 abuts surface 18 and wherein the shorter of the outwardly extending flanges 34 is likely first encountered by the inside diameter B of the conduit depending upon where the actual inside diameter B lies within the range of its intended nominal diameter. The net result of this orientation of the sealing band 14 is to reduce the minimum sealing diameter against flange 34 because the shorter flange 34 is positioned on a smaller diameter of tapered sealing surface 26. Likewise, the maximum sealing diameter is increased against flange 44 because this longer flange 44 is positioned and radially extends from the largest diameter of tapered sealing surface 26.

In the preferred embodiment, the length H of flange 34 is slightly greater than the thickness J of the generally flat main body 46, while the length K of flange 44 is about twice the thickness L of main body 44 at the respective cross section ends. The ribs 36 and 42 are preferably about 1/6th the thickness J or L of the main body 46. Note also that each flange is slightly inwardly disposed to facilitate the initial compliant resilient deflection thereof just as the plug 10 is inserted into an open conduit end. Although the storm drainage conduit is depicted as having circular openings into which a circular embodiment of the device is to be protectively installed on a temporary or permanent basis, the invention is also intended to be provided in oval or elliptical or other planar configurations so as to be protectively installed into the ends of that configuration of, but not limited to, reinforced concrete conduit as well.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A reusable storm drain conduit plug sealing member used on a conduit plug to temporarily close an open end of a drainage conduit, said plug including a rigid disc-shaped member having an inner and an outer surface thereof and a gripable handle extending from a central portion of said outer surface, said disc-shaped member defining a generally planar perimeter of said plug, said inner surface including a sealing surface concentric within said outer perimeter and extending generally orthogonally from said inner surface, said sealing member comprising:

a resilient band having a substantially uniform elongated main body portion, said sealing band being resiliently stretchable in circumference to biasingly engage around and be retained thusly on said sealing surface;

a highly resilient radially outwardly extending flange disposed at each end of said main body portion, each said flange being of different lengths and defining a different outside diameter whereby said flanges resiliently cooperate to effect a sealing insertion into and substantially sealing the end of the conduit;

whereby said plug, with said sealing member in operative position on said plug, is structured to be resiliently retained within the otherwise open end of an in-situ drainage conduit in response to being covered with earth, said plug preventing earth from entering or accumulating within the drainage conduit.

2. A storm drain conduit plug as set forth in claim 1, wherein:

said sealing surface is tapered, in combination with said flanges to accommodate a substantially entire range of variations in corresponding nominal diameters of the drainage conduit.

3. A storm drain conduit plug as set forth in claim 2, wherein said band further includes:

a resilient rib radially inwardly extending from each end of said main body portion, each said rib of generally equal length for enhanced biased gripping against said tapered sealing surface.

4. A storm drain conduit plug as set forth in claim 1, wherein:

one said flange has a length in the range of a thickness of said main body portion while another said flange has a length in the range of twice the thickness of said main body portion.

5. A reusable storm drain conduit plug for temporarily closing an open end of a drainage conduit comprising:

a rigid disc-shaped member having an inner and an outer surface thereof and a gripable handle extending from a central portion of said outer surface, said disc-shaped member defining a generally planar perimeter of said plug;

said inner surface including a sealing surface concentric within said outer perimeter and extending generally orthogonally from said inner surface and in an opposite direction from that of said handle;

a resilient sealing band having a uniform elongated main body portion and formed of elastomeric material and sized in circumference for elastic gripping engagement around said sealing surface, said sealing band further including a highly resilient radially outwardly extending flange disposed at each end of said main body portion, each said flange being of differing length and defining a different outside diameter whereby said flanges resiliently cooperate to effect a sealing engagement into and substantially sealing of the end of the conduit;

whereby said plus resiliently secured by said sealing band within the otherwise open end of an in-situ drainage conduit in response to being covered with earth and prevents earth from entering or accumulating within the drainage conduit.

6. A storm drain conduit plug as set forth in claim 5, wherein:

said sealing surface is tapered, in combination with said flanges, to accommodate substantially all variations from drainage conduit nominal diameters.

7. A storm drain conduit plug as set forth in claim 6, further comprising:

a resilient radially inwardly extending rib from each end of said main body portion, said ribs being of generally equal length for enhanced biased non-sliding gripping against said tapered sealing surface.

8. A storm drain conduit plug as set forth in claim 5, wherein:

one said flange has a length in the range of a thickness of said main body portion while another said flange has a length in the range of twice the thickness of said main body portion.

* * * * *